United States Patent [19]

Ansley et al.

[11] Patent Number: 5,416,876
[45] Date of Patent: May 16, 1995

[54] FIBER OPTIC RIBBON SUBMINIATURE DISPLAY FOR HEAD/HELMET MOUNTED DISPLAY

[75] Inventors: David A. Ansley, Sterling; Ashok Sisodia, Herndon, both, Va.

[73] Assignee: Hughes Training, Inc., Arlington, Tex.

[21] Appl. No.: 187,957

[22] Filed: Jan. 28, 1994

[51] Int. Cl.6 .................................................. G02B 6/06
[52] U.S. Cl. ..................................... 385/116; 345/8; 348/115; 359/630
[58] Field of Search .............................. 385/115–119; 359/618, 630–633; 345/7–9; 348/115, 838; 358/901.1

[56] References Cited

U.S. PATENT DOCUMENTS

| | | | |
|---|---|---|---|
| H779 | 5/1990 | Verona | 359/630 |
| 4,347,508 | 8/1982 | Spooner | 345/8 |
| 4,349,815 | 9/1982 | Spooner | 345/8 |
| 4,439,157 | 3/1984 | Breglia et al. | 359/618 X |
| 5,003,300 | 3/1991 | Wells | 345/8 |
| 5,189,512 | 2/1993 | Cameron et al. | 348/838 |
| 5,319,490 | 6/1994 | Ansley | 359/630 X |

*Primary Examiner*—John D. Lee
*Attorney, Agent, or Firm*—W. K. Denson-Low

[57] ABSTRACT

A lightweight fiber optic television subminiature display for helmet mounted display systems. A one dimensional array of pixels such as a fiber optic (FO) ribbon (64) has an input end (62) which receives input light illuminating the pixels so as to create a first dimension of the display. The output end (64B) of the FO ribbon is moved relative to the observer to create a second dimension. At the helmet (66), the FO ribbon is clamped by a clamp (68) and vibrated by a driver (70) so that the output end of the ribbon is moved to obtain the second dimension. The dimensions of the FO ribbon are selected to provide a natural resonant frequency equal to the television field rate, and the driver vibrates the section (64A) of the ribbon between the clamp and the ribbon output end at the ribbon resonant frequency. The clamp and driver can be very lightweight, thereby reducing the weight of the display elements mounted on the helmet.

37 Claims, 3 Drawing Sheets

FIBER OPTIC RIBBON SUBMINIATURE DISPLAY FOR HEAD/HELMET MOUNTED DISPLAY

FIELD OF THE INVENTION

This invention relates to head/helmet mounted displays (HMDs) where weight is an important factor, and more particularly to an improved lightweight fiber optic ribbon subminiature display for HMDs.

BACKGROUND OF THE INVENTION

A two-dimensional display such as a television has rows and columns of picture elements, or pixels. A one-dimensional display, such as a flying spot scanner or a ribbon of optical (glass or plastic) fibers, has just one row of pixels. The second dimension is created by moving the one-dimensional display relative to the observer. This movement is usually accomplished by rotating a mirror on a galvanometer shaft or by rotating a mirror faceted polygon.

In a known type of HMD, shown in FIG. 1, the light is amplitude modulated at television video rates using an acousto-optical modulator. A rotating mirror faceted polygon scans the light onto the input end of a fiber optic (FO) ribbon via a pair of relay mirrors. The output end of the FO ribbon is positioned one focal length from a lens. One focal length away on the other side of the lens is a mirror mounted on the shaft of a galvanometer. Alternatively, a rotating mirror faceted polygon can be substituted for the galvanometer. The light is reflected by the mirror and passes through the lens again and focuses onto a rear projection screen. The height on the screen is a function of the angle of the mirror. The television image on the screen is relayed by the projection optics, reflects from the partially reflective visor and finally reaches the observer's eyes.

In such a HMD, the complexity of the lens design is affected by the angle of the light exiting the FO ribbon; the smaller the cone angle, the simpler the lens. The optical diffraction limit dictates the minimum cone angle. For example, if the center-to-center fiber spacing is four microns, the minimum cone angle is 4.76 degrees (f-number=F/6). Otherwise, the image of the individual fibers cannot be spatially resolved.

The HMD requires a larger cone angle (typically 18.4 degrees). In order to meet this requirement, the screen must scatter the incident light into a larger cone angle. Unfortunately, scattering in the screen negatively affects the display resolution and contrast. For most applications, color is required. This further increases the complexity and weight of the lens.

SUMMARY OF THE INVENTION

A lightweight, two-dimensional head/helmet mounted fiber optic display is described. The display includes a one-dimensional array of flexible light conductors arranged in a ribbon having an input end and an output end, the output end mounted on the helmet. Preferably, the light conductors are glass or plastic optical fibers. The display further includes means for injecting light into the ribbon input end to create a first dimension of the two-dimensional display, e.g., a polygon scanner for scanning a laser beam across the row of pixel input ends of the ribbon.

In accordance with the invention, the display further includes means mounted on the helmet for moving the output end of the ribbon in relation to an observer wearing the helmet to create the second dimension of the two-dimensional display. In a preferred embodiment, the means for moving the output end includes clamping means for clamping the ribbon at a location spaced from the output end to create a cantilevered ribbon section, and driver means for vibrating the cantilevered ribbon section to deflect the output end of the ribbon. The output end of the ribbon is moved or vibrated at the television field rate.

The display driver means vibrates the ribbon section substantially at its natural resonant frequency. The ribbon dimensions are selected to match the resonant frequency to the television field rate.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
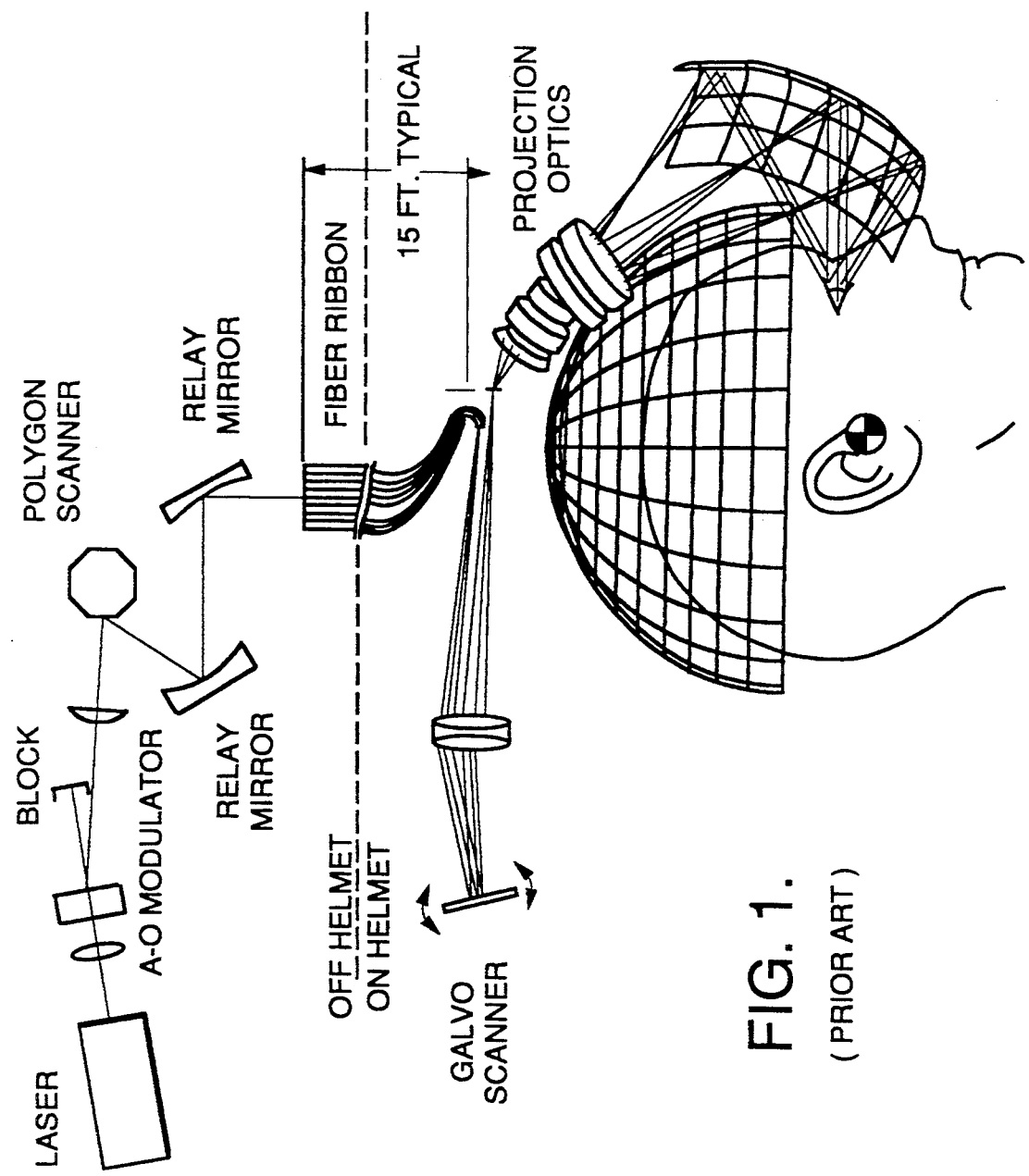
FIG. 1 is a schematic diagram of a conventional head/helmet mounted display (HMD).
Figure 2:
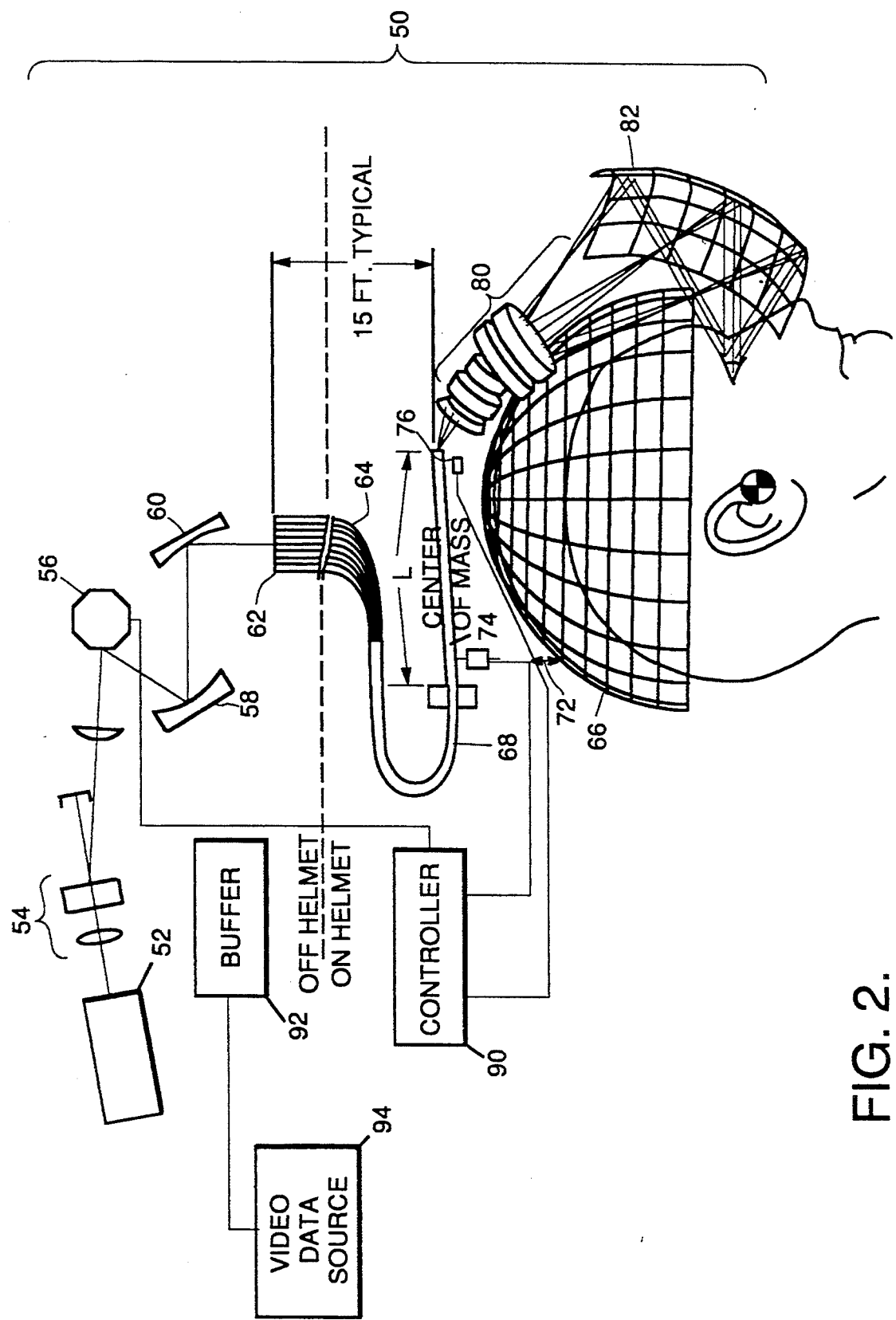
FIG. 2 illustrates an HMD embodying the present invention.

FIG. 2 shows a HMD employing the present invention. While the preferred embodiment is illustrated in the context of a helmet mounted display, it is to be understood that in alternate embodiments, the head mounted display elements need not be secured or supported by a hard helmet structure, but may instead be supported by a headband or visor structure. The components of the HMD located off the helmet are conventional. Thus, the source of input light is a laser 52 whose output is amplitude modulated by acousto-optical modulator 54. The modulated light is reflected by a polygon scanner 56 and relay mirrors 58 and 60 to the input end 62 of a flat FO ribbon 64. The ribbon 64 typically comprises several hundred to several thousand glass or plastic optical fibers. The scanner 56 scans the laser light beam across the one dimension array of fiber input ends to create the row dimension of the two dimensional television display. The ribbon 64 leads to the helmet 66 worn by the user of the system. Typically the ribbon can have a length of 15 feet leading to the helmet.

A light emitting diode (LED) array can alternatively be substituted for the laser 52, modulator 54, polygon scanner 56 and relay mirrors. Another alternative is to use microlasers, e.g., channel waveguide lasers or vertical emitting cavity lasers, one for each fiber.

Figure 3:
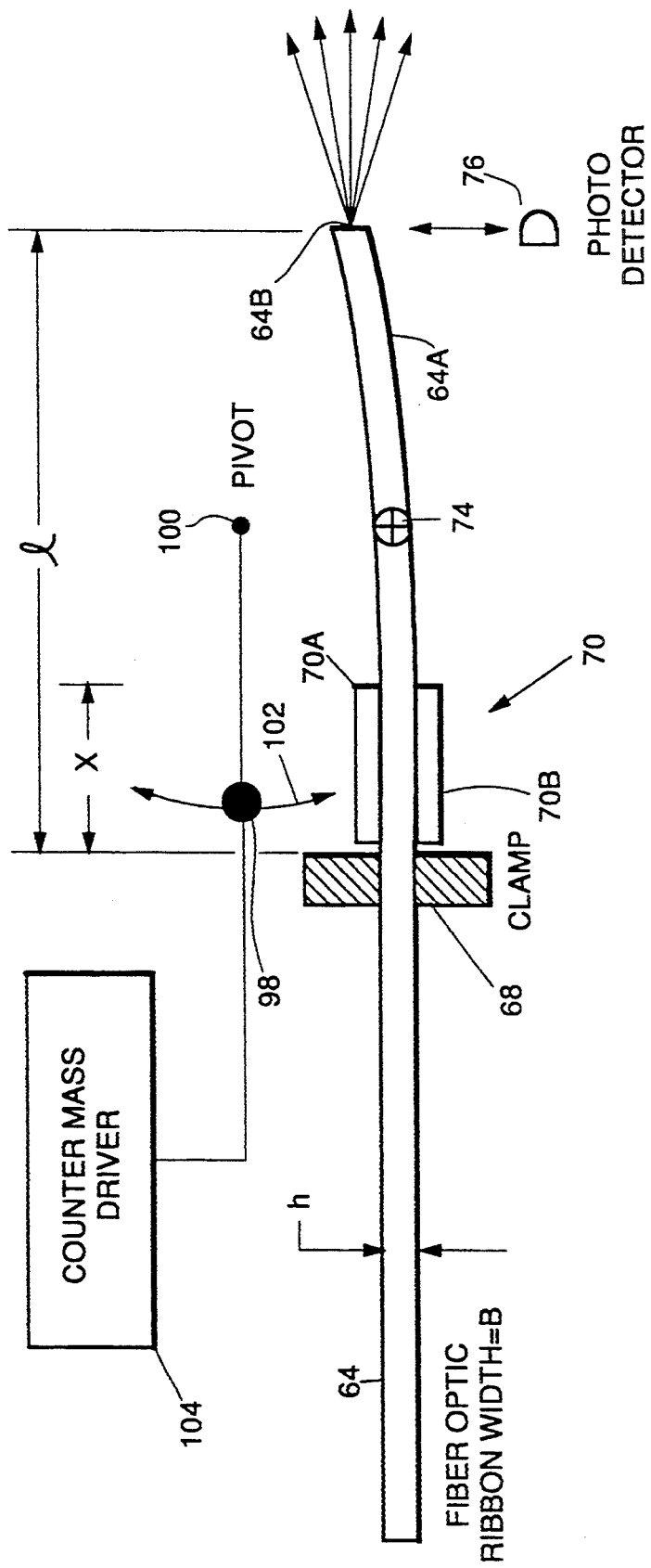
FIG. 3 illustrates the fiber optic ribbon clamp and driver of the HMD of FIG. 2.

The display further includes a means mounted on the helmet to move the output end 64B of the FO ribbon 64 so as to create the second dimension of the television display. In accordance with the invention, and as more particularly shown in FIG. 3, the FO ribbon 64 is clamped a distance L from its output end 64B by a clamp 68. A driver 70 is connected to the ribbon section 64A at a position between the clamp 68 and the ribbon output end 64B, and vibrates the ribbon section along an axis 72 generally orthogonal to the length of the ribbon. The driver vibrates the ribbon at its natural resonant frequency, with the width, thickness and length of the FO ribbon selected to provide a natural resonant frequency equal to the television field rate. The clamp 68 and driver 70 replace the mirror, screen and the galvanometer or mirror faceted polygon used in the conventional HMDs described above to achieve movement of the output end of the FO ribbon.

The light emitted from the output end 64B of the FO ribbon is passed through a conventional projection optics assembly 80 and reflected from the optical combiner 82 comprising the helmet display to the viewer's eye.

The width B and the thickness H of the ribbon 64 is chosen so that the resonant frequency of the cantilevered FO ribbon is equivalent to the television field rate of the display. Thus, the desired resonant frequency in an application employing the standard television field rate in the United States is 60 Hz; the desired-resonant frequency would be 50 Hz for applications employing the standard television field rate used in Europe and Japan.

The cantilevered section 64A of the FO ribbon 64 can be considered to be a beam. The formula for the resonant frequency of a cantilevered beam is well known. It is:

Angular Natural Frequency $= A((E^*I)/(M^*L^4))^{\frac{1}{2}}$ where
E = Young's Modulus
I = Area Moment of Inertia of Beam Cross Section
L = Length of Beam
M = Mass per Unit Length of Beam
A = Coefficient which depends on the vibration mode (for the fundamental mode, A = 3.52)

For glass (Young's modulus $= 6.7 \times 10^6$ psi), the fundamental resonant frequency is 60 Hz when
L = 106.68 mm
B = 20.00 mm
H = 1.00 mm Other combinations of L, B and H will produce 60 Hz resonance. The exemplary values given above for L, B and H are appropriate for glass FO ribbons and HMDs. The "X" dimension shown in FIG. 3, the distance of the driver from the clamp, can be any distance. The shorter X is, the greater the driving force required. Some exemplary values for X and the driving force for an assumed damping factor "Q" of 20 are shown in Table I, where "Drive Location" is the distance from the fixed end of ribbon section 64A, "Average Disp." is displacement perpendicular to the ribbon at the drive location, "Driving Force" is the force required to move the ribbon end ±6 mm, "Power" is the input power for a damping factor "Q" of 20, and "Maximum Stress" is at the fixed end.

TABLE I

| Drive Location (in.) | Average Disp. (in.) | Driving Force (lb.) | Driving Power (W) | Maximum Stress (psi) |
| --- | --- | --- | --- | --- |
| 0.24706 | 0.001613 | 0.635 | 0.021867 | 7549 |
| 0.49412 | 0.005873 | 0.16 | 0.020066 | 7229 |
| 0.74118 | 0.012419 | 0.0721 | 0.01912 | 6944 |
| 0.98824 | 0.021102 | 0.0415 | 0.018699 | 6777 |
| 1.4824 | 0.043795 | 0.0194 | 0.018142 | 6564 |
| 1.9765 | 0.072475 | 0.0116 | 0.017951 | 6465 |

Because the FO ribbon section 64A resonates at 60 Hz, the size of the driver 70 can be very small. The design of the driver 70, however, is very critical. The preferred ribbon driving system includes thin slices 70A, 70B of piezo ceramic, arranged in opposite polarization, sandwiched to the top and bottom surfaces of the fiber optic ribbon section 64A. For upward motion, the top piezo ceramic slice 70A contracts and the bottom piezo ceramic slice 70B expands. For downward motion, the top piezo ceramic slice 70A expands and the bottom piezo ceramic slice 70B contracts.

Unless dynamically counter balanced, the up-down movement of the ribbon section 64A causes vibration. Dynamic counter balancing consists of moving an equal mass in a direction opposite to the movement of the center of mass 74 of the FO ribbon section. In order to completely eliminate vibration, the mass must move in an arc which is identical to the arc of the center of mass of the FO ribbon section 64A. In one embodiment, this dynamic counter balancing is achieved by shaping the piezo ceramics to deform and move in a direction opposite to the movement of the center of mass 74. Alternatively, a counter mass 98 can be mounted to the helmet for swinging movement about pivot 100, and a driver 104 actuated to vibrate the counter mass in antiphase with the vibration of the ribbon section. Thus, the counter mass 98 is driven by driver 104 to swing in equal and opposite direction to the movement of the center of mass 74 of the ribbon section 64A. The mass of the counter mass 98 is equal to the mass of the cantilevered ribbon section 64A, and the length of the pivot arm is selected to be equal to the distance between the ribbon center of mass 74 and the clamp 68. One technique of driving the counter mass is to use a metal counter mass suspended between two plates, and to energize the plates so as to electrostatically or magnetically attract or repel the mass. The counter mass 98 moves along an arc 102 of about the same size as the arc through which the center of mass 74 moves.

The deflection of the cantilevered FO ribbon section 64A in an exemplary application in which the dimension values of the ribbon are the exemplary values given above is typically ±6 mm. The feedback (servo) control of the deflection is sensed via a photo detector 76 such as a photo transistor. The photo detector is positioned slightly outside the television display area.

The photo detector is also used to synchronize the television video with the phase of the FO ribbon deflection. The FO ribbon deflection versus time relationship is not a linear function. Consequently, the television video must lead or lag a linear reference by a predetermined amount depending on the position of the deflected FO ribbon. This lead or lag is easily calculated. For example, FO ribbon deflection versus time can be calculated using a finite element stress and strain analysis computer program marked under the trademark ANSYS by Swanson Analysis Systems, Houston, PA. As a first order approximation, the deflection versus time function is proportional to sine ($\omega t$) where $\omega = 2\pi$ frequency and t = time.

Implementation of the lead or lag is done by storing several lines of the television video in line buffers. The readout from the line buffers must be synchronized to the FO ribbon deflection. Thus, controller 90 is configured to control the operation of the polygon scanner 56 and driver 70, and receives the photodetector sensor signals from photodetector 76. The video data is output from the video data source 94 into the line buffers 92, which are under control of controller 90. The video data controls the A-O modulator 54, with the polygon scanner operated to scan the modulated laser beam across the input end of the ribbon to sequentially illuminate the input end of each fiber/pixel, thereby creating the first video line, i.e., the first dimension of the television display. The position of successive rows of a given television field is controlled by the movement of the output end 64B of the ribbon. Each traverse of the ribbon end from its topmost position to its lowermost position provides a television field. The driver is then reversed in direction and the ribbon end brought from its lowermost position to the topmost position to commence displaying the next field.

The photo detector is also used to sense unexpected FO ribbon deflection caused by external shock and vibration. The start of the next television field is advanced or retarded depending upon whether the photodetector 76 senses the end of the presently displayed television field early or late.

In order to obtain an 18.4 degree (F/1.5) cone angle of light from the end of the FO ribbon required for an exemplary application, two methods may be used. A high numerical aperture FO ribbon (NA> =0.33) can be used or a scattering coating (similar to the coating on a conventional screen) can be painted on the output end of the FO ribbon. Higher numerical aperture FO ribbons (NA> =0.40) are commercially available. Therefore, use of such higher numerical aperture ribbons is the solution of choice. A coating would typically only be required if the particular HMD required a cone angle that is greater than the arc sine of the fiber optic numerical aperture.

The estimated weight savings of the invention is shown below. All weights are in grams and are "per eye":

| Conventional HMD: | |
| --- | --- |
| Mirror | 2 |
| Galvo | 120 |
| Mount | 10 |
| Lens | 70 |
| Mount | 46 |
| Screen | 1 |
| Mount | 1 |
| TOTAL | 250 |
| New HMD: | |
| Clamp | 3 |
| Driver | 5 |
| Counter Mass | 12 |
| Ribbon | 6 |
| Photo Detector | 1 |
| Mount | 1 |
| TOTAL | 28 |

It is understood that the above-described embodiment is merely illustrative of the possible specific embodiments which may represent principles of the present invention. Other arrangements may readily be devised in accordance with these principles by those skilled in the art without departing from the scope and spirit of the invention.

What is claimed is:

1. A two-dimensional head/helmet mounted fiber optic display, comprising:
    a one-dimensional array of flexible light conductors arranged in a ribbon having an input end and an output end;
    means for injecting light into said input end of said ribbon to create a first dimension of said two-dimensional display;
    means for moving said output end of said ribbon in relation to an observer's eye, said means comprising:
        clamping means for clamping said ribbon at a location spaced from said output end to create a cantilevered ribbon section; and
        driver means for vibrating said cantilevered ribbon section to deflect said output end of said ribbon.

2. The display of claim 1 wherein said cantilevered ribbon section is characterized by a natural resonant frequency, and said driver means vibrates said ribbon section substantially at said resonant frequency.

3. The display of claim 2 wherein length, width and thickness dimensions of said ribbon section are selected so as to provide said natural resonant frequency.

4. The display of claim 3 wherein said display is characterized by a television field rate, and said driver means comprises means for vibrating said ribbon section at said television field rate.

5. The display of claim 4 wherein said natural resonant frequency of said cantilevered ribbon section is substantially equal to said television field rate.

6. The display of claim 1 wherein said display is characterized by a television field rate, and said driver means comprises means for vibrating said ribbon section at said television field rate.

7. The display of claim 6 further comprising means for sensing said deflection of said output end of said ribbon and means responsive to said sensing means for controlling said driver means to synchronize said deflection to operation of said light injecting means.

8. The display of claim 7 wherein said sensing means comprises a photodetector disposed to receive light from said output end of said ribbon.

9. The display of claim 1 wherein said light conductors comprise optical fibers.

10. The display of claim 9 wherein said optical fibers are high numerical aperture fibers.

11. The display of claim 1 wherein said light injecting means comprises means for scanning a modulated light beam across said ends of said light conductors at said input end of said ribbon.

12. The display of claim 11 wherein said light injecting means further comprises a laser for generating a laser light beam and means for amplitude modulating said beam to produce said modulated light beam.

13. The display of claim 1 further comprising an optical combiner disposed in front of the observer's eye, and a projection optics assembly to project light emitted from said output end of said ribbon onto said optical combiner for reflection to the observer's eye.

14. The display of claim 1 wherein said cantilevered ribbon section is characterized by a center of mass location which moves as said ribbon section is vibrated, and wherein said driver means has a driver mass associated therewith, said driver means being operated so as to move said driver mass in a direction opposite to movement of said center of mass location of said ribbon, thereby reducing vibration.

15. The display of claim 14 wherein said center of mass location is moved along an arc during said vibration of said ribbon section, and wherein said driver mass is moved along an arc during operation thereof.

16. The display of claim 1 further comprising a screen scattering coating applied at said output end of said ribbon.

17. The display of claim 1 further comprising a counterbalancing mass, and means for vibrating said counterbalancing mass in antiphase to vibrational movement of said cantilevered ribbon section to reduce vibration.

18. The display of claim 17 wherein said counterbalancing mass has a mass value substantially equal to a mass value associated with said ribbon section, and said counterbalancing mass is supported for swinging movement about a pivot point in an equal and opposite movement to vibrational movement of a center of mass of said cantilevered ribbon section.

19. The display of claim 1 wherein said output end of said ribbon is mounted on a helmet, said means for moving said output end is mounted on said helmet, and said helmet is worn by the observer.

20. A two-dimensional fiber optic display, comprising:
   a one-dimensional array of flexible light conductors arranged in a ribbon having an input end and an output end;
   means for injecting light into said input end of said ribbon to create a first dimension of said two-dimensional display; and
   means for moving said output end of said ribbon in relation to an observer's eye, said means comprising:
      clamping means for clamping said ribbon at a location spaced from said output end to create a cantilevered ribbon section; and
      driver means for vibrating said cantilevered ribbon section to deflect said output end of said ribbon.

21. The display of claim 20 wherein said cantilevered ribbon section is characterized by a natural resonant frequency, and said driver means vibrates said ribbon section substantially at said resonant frequency.

22. The display of claim 21 wherein length, width and thickness dimensions of said ribbon section are selected so as to provide said natural resonant frequency.

23. The display of claim 22 wherein said display is characterized by a television field rate, and said driver means comprises means for vibrating said ribbon section at said television field rate.

24. The display of claim 23 wherein said natural resonant frequency of said cantilevered ribbon section is substantially equal to said television field rate.

25. The display of claim 20 wherein said display is characterized by a television field rate, and said driver means comprises means for vibrating said ribbon section at said television field rate.

26. The display of claim 25 further comprising means for sensing said deflection of said output end of said ribbon and means responsive to said sensing means for controlling said driver means to synchronize said deflection to operation of said light injecting means.

27. The display of claim 26 wherein said sensing means comprises a photodetector disposed to receive light from said output end of said ribbon.

28. The display of claim 20 wherein said light conductors comprise optical fibers.

29. The display of claim 28 wherein said optical fibers are high numerical aperture fibers.

30. The display of claim 20 wherein said light injecting means comprises means for scanning a modulated light beam across said ends of said light conductors at said input end of said ribbon.

31. The display of claim 30 wherein said light injecting means further comprises a laser for generating a laser light beam and means for amplitude modulating said beam to produce said modulated light beam.

32. The display of claim 20 further comprising an optical combiner disposed in front of the observer's eye, and a projection optics assembly to project light emitted from said output end of said ribbon onto said optical combiner for reflection to the observer's eye.

33. The display of claim 32 wherein said cantilevered ribbon section is characterized by a center of mass location which moves as said ribbon section is vibrated, and wherein said driver means has a driver mass associated therewith, said driver means being operated so as to move said driver mass in a direction opposite to movement of said center of mass location of said ribbon, thereby reducing vibration.

34. The display of claim 33 wherein said center of mass location is moved along an arc during said vibration of said ribbon section, and wherein said driver mass is moved along all arc during operation thereof.

35. The display of claim 20 further comprising a screen scattering coating applied at said output end of said ribbon.

36. The display of claim 20 further comprising a counterbalancing mass, and means for vibrating said counterbalancing mass in antiphase to vibrational movement of said cantilevered ribbon section to reduce vibration.

37. The display of claim 36 wherein said counterbalancing mass has a mass value substantially equal to a mass value associated with said ribbon section, and said counterbalancing mass is supported for swinging movement about a pivot point in an equal and opposite movement to vibrational movement of a center of mass of said cantilevered ribbon section.

* * * * *